(12) United States Patent  
Kitamura et al.

(10) Patent No.: US 7,561,350 B2  
(45) Date of Patent: Jul. 14, 2009

(54) OPTICAL UNIT AND ITS MANUFACTURING METHOD

(75) Inventors: Yoshiro Kitamura, Osaka (JP); Seiji Kumazawa, Osaka (JP); Koji Funami, Kyoto (JP); Kazumasa Takata, Osaka (JP); Yasuo Nishihara, Osaka (JP)

(73) Assignee: Panasonic Corporation, Osaka (JP)

( * ) Notice: Subject to any disclaimer, the term of this patent is extended or adjusted under 35 U.S.C. 154(b) by 8 days.

(21) Appl. No.: 11/793,234

(22) PCT Filed: Dec. 15, 2005

(86) PCT No.: PCT/JP2005/023050

§ 371 (c)(1), (2), (4) Date: Aug. 20, 2007

(87) PCT Pub. No.: WO2006/064876

PCT Pub. Date: Jun. 22, 2006

(65) Prior Publication Data

US 2008/0144196 A1  Jun. 19, 2008

(30) Foreign Application Priority Data

Dec. 17, 2004  (JP)  .............................. 2004-365673

(51) Int. Cl.  
*G02B 7/02* (2006.01)  
*G02B 15/14* (2006.01)

(52) U.S. Cl. ...................................... 359/811; 359/694  
(58) Field of Classification Search ......... 359/694–701, 359/819–823  
See application file for complete search history.

(56) References Cited

U.S. PATENT DOCUMENTS 6,873,478 B2 * 3/2005 Watson ....................... 359/819  
7,345,832 B2 * 3/2008 Shibuya et al. .............. 359/811

FOREIGN PATENT DOCUMENTS

| JP | 63-20114 | 2/1988 |
| JP | 9-35317 | 2/1997 |
| JP | 2005-292441 | 10/2005 |
| JP | 2005-316044 | 11/2005 |
| JP | 2006-17795 | 1/2006 |

* cited by examiner

*Primary Examiner*—Mohammed Hasan  
(74) *Attorney, Agent, or Firm*—Wenderoth, Lind & Ponack, L.L.P.

(57) ABSTRACT

A method for manufacturing an optical unit (10) having an optical element (22) and a support member (12) supporting the optical element. According to the method, at least one of the optical element (22) and the support member (12) is deformed, securing the optical element (22) and the support member (12) together.

13 Claims, 14 Drawing Sheets

OPTICAL UNIT AND ITS MANUFACTURING METHOD

BACKGROUND OF THE INVENTION

1. Field of the Invention

The present invention relates to an optical unit comprising an optical element and a support member for supporting the optical element and a method for manufacturing the optical unit.

2. Description of the Related Art

An optical disc has been used as a medium for storing a large volume of data. In order to storing information in a high density and retrieving that information reliably, each component of an optical pickup device should be mounted so precisely. For this purpose, JP H04-113521 A discloses a technology for adjusting a thickness of adhesive provided between an objective lens and a holder supporting the objective lens and thereby controlling a tilting of the object lens. With this technology, however, a local thickness variation of the adhesive may result in further tilting of the objective lens. In accordance with JP H08-161755 A, a bimetal or deformable member is mounted between the objective lens and the holder for holding the objective lens, so that the deformable member is deformed by an application of heat energy to control the tilting of the objective lens. Likewise, JP H08-180422 A and JP H09-161755 A propose a method in which a support member made of shape-memory alloy or thermosensitive material is mounted between the objective lens and the holder for holding the objective lens and a laser is irradiated onto a part of the support member to recover the original shape for the adjustment of the tilting of the objective lens. The techniques disclosed in the above-described prior art documents JP H08-161755 A, JP H08-180422 A and JP H09-161755 take more time to control the tilting of the objective lens in order to prevent a possible deformation of the holder which might otherwise be caused by an external force applied at the adjustment. Also, the support member is needed between the lens and the holder, which further complicates the structure.

SUMMARY OF THE INVENTION

A purpose of the invention is to provide a method for manufacturing an optical unit in which a posture of an optical unit is well controlled in a reliable manner with a simple structure and an optical unit manufactured by the method.

To attain the purpose, a method for manufacturing the optical unit according to the present invention is deforming at least one of opposing surfaces of the optical element and the support member, and securing the optical element and the support member together.

Also, in the optical unit according to the present invention, at least one of the opposing support member and the optical element has a projection and the support member and the optical element are secured while leaving a gap between the optical element and the support member.

According to the invention, an optical unit in which a posture of the optical element is adjusted precisely and is reliably manufactured.

DETAILED DESCRIPTION OF THE PREFERRED EMBODIMENTS

Figure 1:
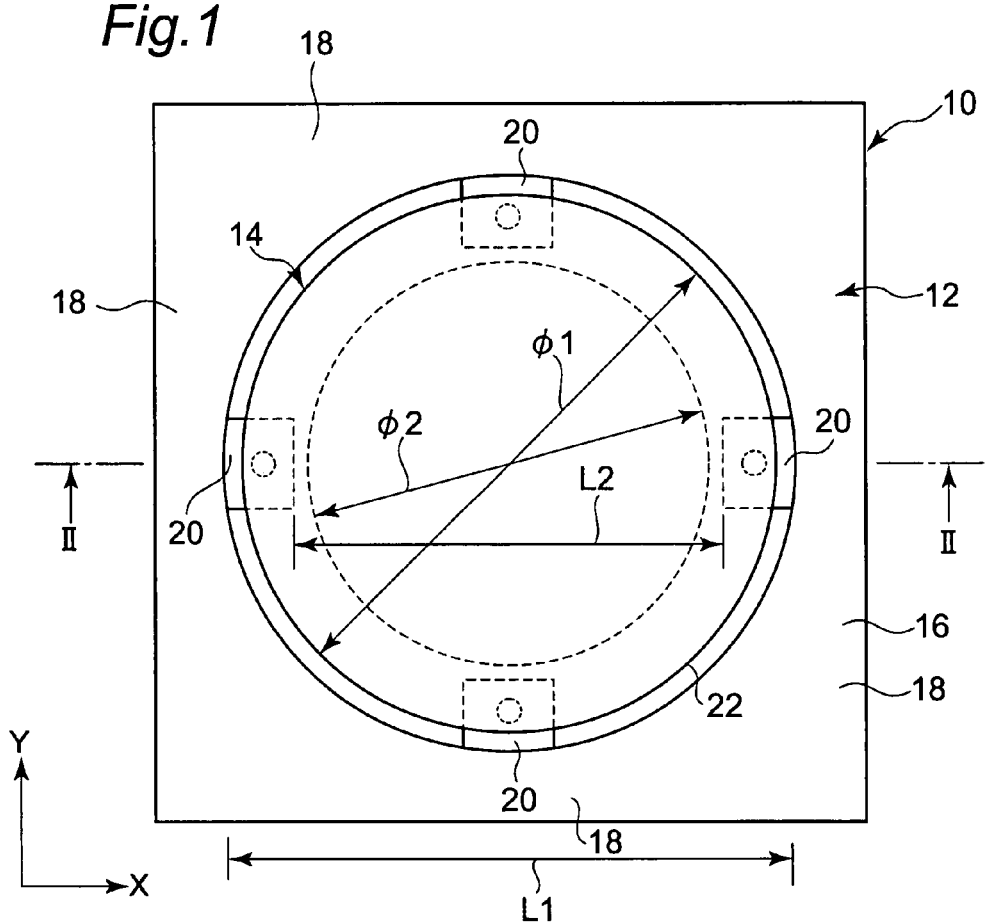
FIG. 1 is a plan view of an example of an optical unit, the posture of which being adjusted by an adjusting device according to the present invention.

With reference to the drawings, various embodiments according to the present invention will be described below. In the following discussions, like reference numerals designate like parts or members. Also, terminologies each indicating specific directions, such as "upper", "lower", and phrases including such terminology are used, for the better understanding of the invention, however, those terminologies and phrases should not be used for limiting the scope of the invention. In addition, throughout this specification the language "posture" means a tilting of an optical unit including an optical element, relative to an optical axis thereof.

First Embodiment

Figure 2:
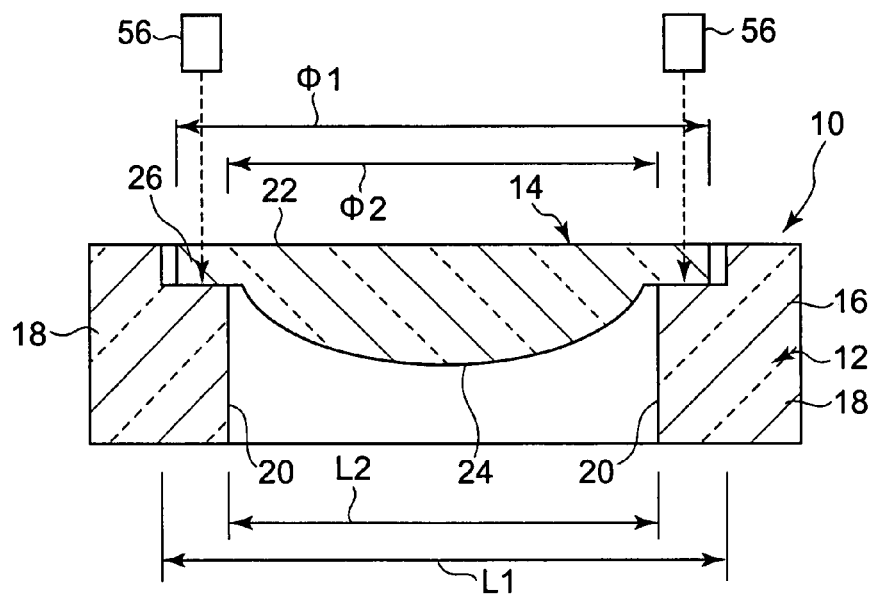
FIG. 2 is a cross sectional view taken along lines II-II, of the optical unit in FIG. 1.

Referring to FIGS. 1 and 2, the optical unit of the present invention of which posture is controlled by a posture control device has a holder 12 fixedly supported on a base or support portion (not shown), and an optical element 14 thereof supported by the holder 12. In this embodiment, the holder 12 has a frame 16. The frame 16 has two frame portions 18 extending in the X-direction and two frame portions 18 extending in the Y-direction, which is perpendicular to the X-direction, and defines a circular opening surrounded by four frame portions. The four frame portions 18 each have inwardly extended supports 20 defined therewith at substantially intermediate portions of thereof. Preferably, as shown in the drawing, the upper surface of each support 20 is positioned lower than the upper surface of the frame 16.

The optical element 14 is an optical lens, for example. In this embodiment, the lens 22 is a plane-convex lens having a spherical portion 24 with an upper plane surface and a lower convex surface and a peripheral portion 26. For example, the peripheral portion 26 has an outer diameter $\phi 1$ which is smaller than a distance L1 between the opposing frame portions 18 in X and Y directions. The spherical portion 24 has an outer diameter $\phi 2$ which is smaller than a distance L2 between the opposing supports 20 in X and Y directions.

The holder 12 and the lens 22 are made of respective materials each capable of being melted by the application of heat. Preferably, the holder 12 is made of material capable of absorbing substantially 80 percent of light ranging from optical to near-infrared wavelength, for example, wavelength of substantially 400-1,100 nm. Preferably, the lens 22 is made of material capable of transmitting substantially 80 percent of light ranging from optical to near-infrared wavelength, for example, wavelength of substantially 400-1,100 nm. In this embodiment, the holder 12 is made of, among other heat-meltable materials, material having a glass-transition temperature of substantially 150° C., such as amorphous polyolefin. Also, the lens 22 is made of material having a glass-transition temperature of substantially 135° C., such as liquid crystal polymer, which is easier to melt than that of holder 12.

The holder 12 and the lens 22 so structured are combined, so that the peripheral portion 26 of the lens 22 is supported by four supports 20 of the holder 12 while the center of the lens substantially coincides with the center of the holder 12 as shown in the drawing. As described below, the posture of the lens 22 relative to the holder 12 is detected, then evaluated and, based upon the evaluation result, adjusted.

Figure 3:
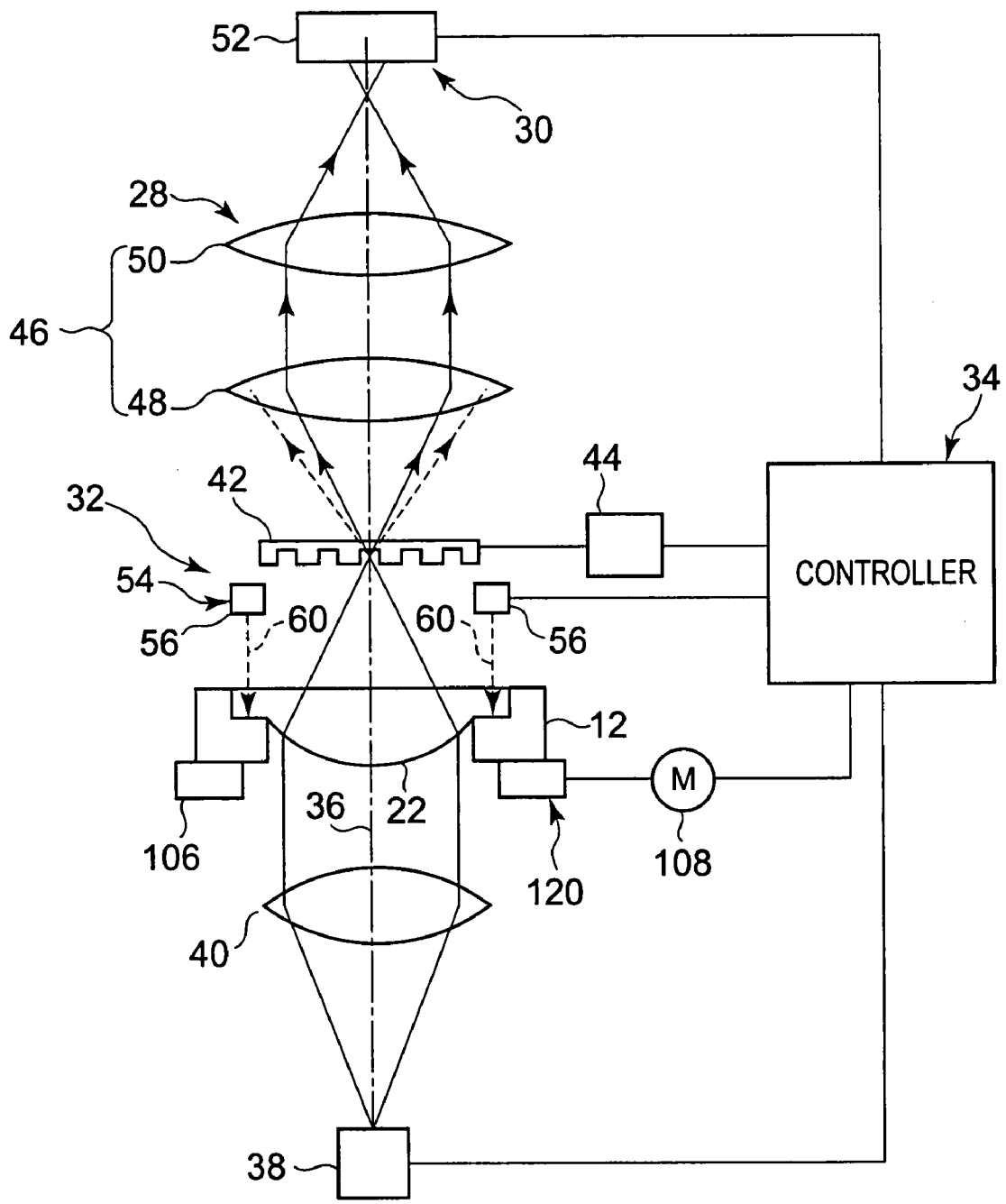
FIG. 3 is a front view showing a structure of the posture adjusting device including the optical unit shown in FIGS. 1 and 2.

FIG. 3 shows a posture control system 28. The posture control system 28 has an evaluation unit 30 for evaluating the posture of the lens 22, an adjustment unit 32 for adjusting the posture of the lens 22 according to the evaluation result made by the evaluation unit 30, and a control unit 34 for controlling the evaluation unit 30 and the adjustment unit 30.

The evaluation unit 30 has various components disposed on opposite sides (upper and lower sides in the drawing) of the lens 22 supported by the holder 12. In this embodiment, the evaluation unit 30 has a lighting source or light source 38 for emitting light along an optical axis 36 of the posture control system 28. Preferably, a laser device capable of emitting a laser beam is used for the light source 38. Preferably, the laser beam is coherent light, such as helium-neon laser. An optical unit 40 is provided between the light source 38 and the lens 22 for guiding light, in the form of parallel beams, from the light source 38 into the lens 22. The optical unit 40 has one or more lens. Other optical elements such as a mirror may be provided for the optical unit 40.

A transmissive diffraction grating 42 is disposed at or adjacent a focal point of light transmitted through the lens 22. The diffraction grating 42 is made of a transparent plate and disposed on a plane extending perpendicular to the optical axis 36. In particular, the grating 42 has a plurality of equally spaced grooves extending in a direction perpendicular to the optical axis 36, on its major surface facing the lens 22 or the opposite major surface away from the lens. Also, the grating 42 is drivingly connected to a transport mechanism 44 so that, by the driving of the transport mechanism 44, it is transported in a direction perpendicular to the grooves and on the plane perpendicular to the optical axis 36. Preferably, the transport mechanism 44 employs a piezoelectric element.

An optical unit 46 has a lens 48 into which light (i.e., diffracted light) transmitted through the grating 42 enters. In this embodiment, the size and the pitch of the grooves of the grating 42 are so determined that a shearing interference figure made of +1st-order and 0th-order diffracted rays or 0th-order and −1st-order diffracted rays from the diffraction grating 42 is transmitted into the lens 48. Also, the optical unit 46 has a lens 50 for collecting light transmitted through the lens 48. Although not shown, in addition to the lens 48 and 50, the optical unit 46 may have other optical elements such as a mirror.

The evaluation 30 has an image pickup device or image receptor 52 for receiving light from the optical unit 46. Preferably, the image receptor 52 is made of charge coupled device (CCD) and is adapted to receive the shearing interference figure transmitted into the lens 48.

The controller 34 is electrically connected to the light source 38, the transport mechanism 44, and the image receptor 52 and energizes the light source 38 at the posture evaluation of the lens 22. The light from the light source 38 is transmitted into the optical unit 40 where it is transformed into coherent or substantially coherent light which is then transmitted through the lens 22 into the diffraction grating 42. The grating generates diffracted rays, of which +1st-order and 0th-order diffracted rays or 0th-order and −1st-order diffracted rays are superimposed at the pupil of the lens 48 to form the shearing interference figure. The interference figure is transmitted into the lens 48 where it is transformed again into coherent or substantially coherent light and then transmitted through the lens 50 into the image receptor 52. The image receptor 52 generates a signal corresponding to the received shearing interference figure and transmits the signal into the controller 34.

While the light source 38 is being energized, the controller 34 drives the transport mechanism 44 to transport the diffraction grating 42 in the direction perpendicular to the optical axis 36. Thus, if the lens 22 is tilted relative to the optical axis 36 or the lens 22 includes any aberration such as spherical aberration, astigmatism, image surface distortion, distortion, and/or color aberration, a light intensity of each point in the shearing interference figure varies. Using this variation of the light intensity, the controller 34 evaluates the posture of the lens 22.

The above described method and apparatus for evaluating the posture of the lens is simply one example and various conventional methods and apparatuses can be used instead. For example, another method and apparatus capable of being used in this invention is disclosed in JP 2000-329648 A and the corresponding U.S. Pat. No. 6,809,829, the entire disclosure thereof being incorporated herein by reference.

Figure 4:
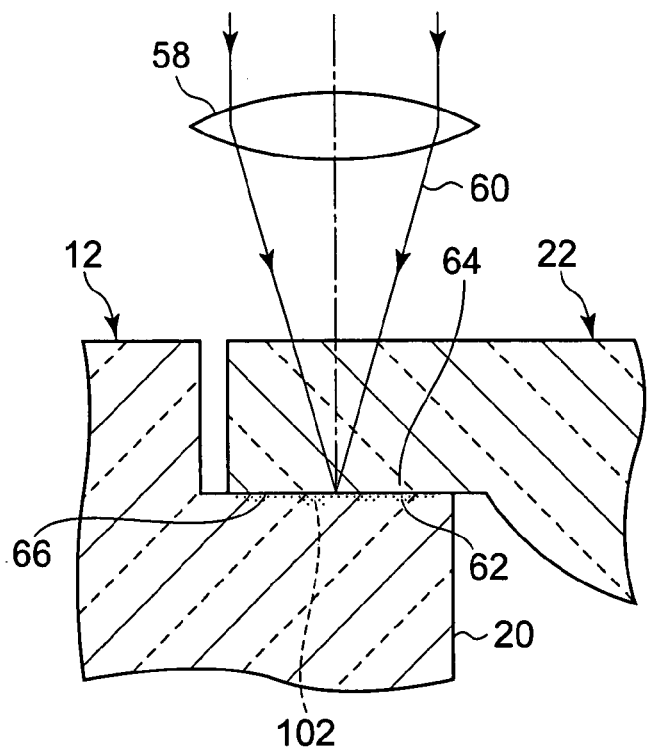
FIG. 4 is a cross sectional view for use in describing a posture adjusting method of the optical unit with the posture adjusting device in FIG. 3.
Figure 5:
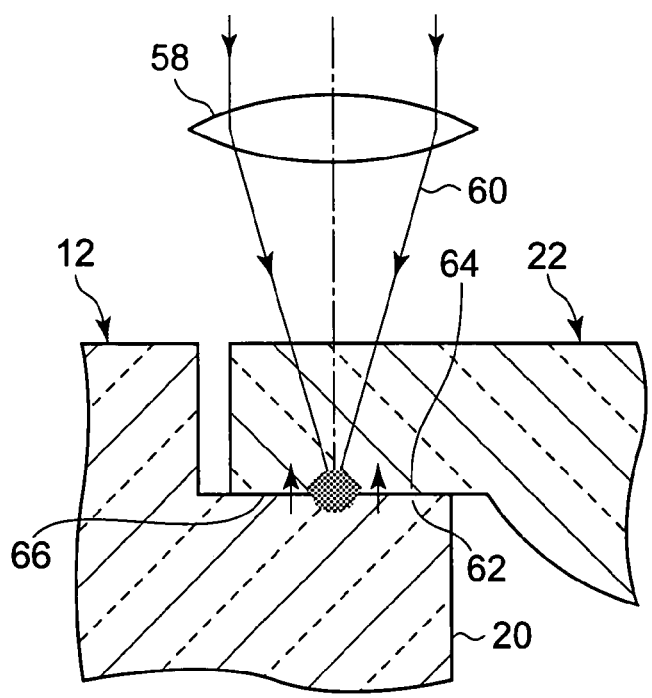
FIG. 5 is a cross sectional view for use in describing a posture adjusting method of the optical unit with the posture adjusting device in FIG. 3.

Referring to FIGS. 3-5, the lens posture adjusting unit 32 has heating devices 54 each provided above four supports 20. In this embodiment, the heating device 54 has a laser source 56 capable of emitting heat laser and an optical unit 58 for collecting laser from the laser source 56, which are so arranged that the laser from laser source 56 is focused on or adjacent the boundary surface 66 between the upper surface support portion 62 of the support 20 and the opposing lens portion 64. In this embodiment, the laser 60 from the laser source 56 has a wavelength of 810 nm. The heating device 54 is so controlled that the energy irradiated on the upper surface of the lens 22 has 0.5 watt and the laser spot diameter at the boundary 66 has 0.1 mm.

Figure 6:
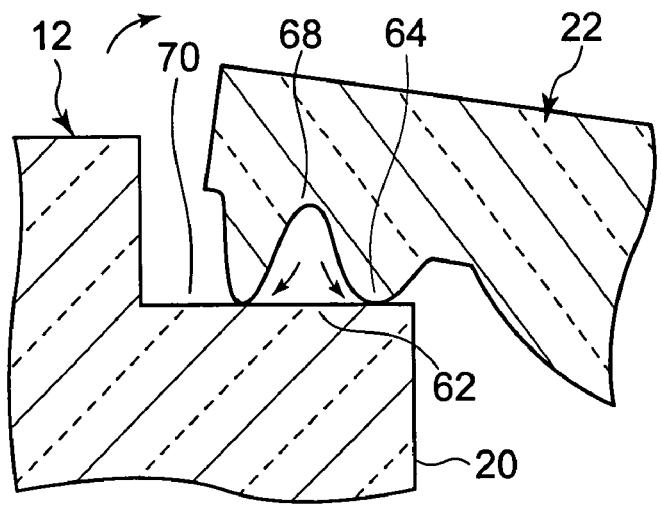
FIG. 6 is a cross sectional view for use in describing a posture adjusting method of the optical unit with the posture adjusting device in FIG. 3.
Figure 7:
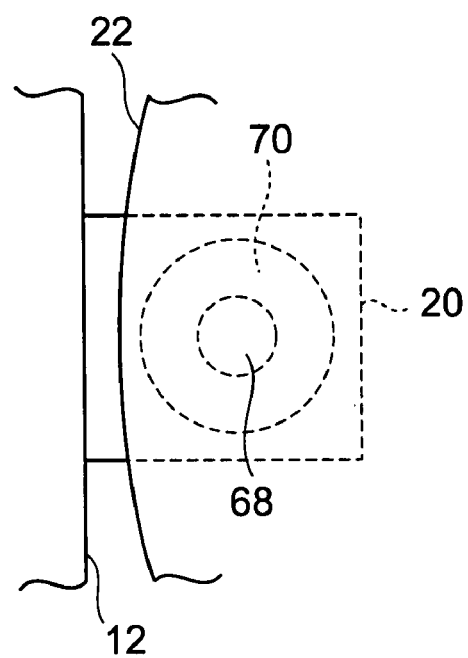
FIG. 7 is a partial plan view for describing a posture adjusting method of the optical unit with the posture adjusting device in FIG. 3.

In the posture adjustment operation, the controller 34 energizes one or more heating devices 54 to emit laser 60 from the laser source 56, which will be described in detail below. As shown in FIGS. 4 and 5, the emitted laser 60 is converged by the optical unit 58 on or adjacent the boundary surface 66, heating the support portion 62 and the opposing lens portion 64, in the vicinity of the boundary surface 66. Specifically, the support portion 62 exposed to laser is heated. The heat generated at the support portion 62 is then transferred to the lens portion 64, causing the lens portion 64 to be heated. Accordingly, since the glass-transition temperature of the lens portion 64 is lower than that of the support portion 62 as described above, the lens portion 64 at or adjacent the laser spot is heat-expanded. As shown in FIGS. 6 and 7, further irradiation of the laser results in the center 68 of the heated portion of the lens 64 being heat-shrinked to cause an upwardly concave recess. Simultaneously, the heated center 68 is evaporated into vapor and the vapor pressure raises the lens 22 upwardly. The lens material around the heated center 68 flows radially outwardly to cause an annular ridge 70 surrounding the heated center 68, raising the lens portion 64 relative to the support portion 62.

Tests were made to obtain a relationship between the laser irradiation time and the amount of tilting. The dimensions and materials of the holders and lenses used in the tests will be described. The outer diameter φ1 of the lens periphery were 2-8 mm, preferably 3.8 mm. The outer diameter φ2 of the spherical portion of the lens was 1.4-7.4 m, preferably 3.2 mm. The distance L1 between the opposed frame portions was 2.2-8.2 mm, preferably 4 mm. The wavelength of the laser was 810 nm. The laser power at the upper surface of the lens periphery was 0.5 W. The diameter of the laser spot at the boundary surface was 0.1 mm. The tilting a was defined by the following equation (1). The laser was irradiated onto one of the two opposed support portions and then the tilting was measured. The laser irradiation times were 1, 1.5, 2, and 3 seconds.

$$\alpha = \delta/\varphi 1$$

wherein

α: tilting (radian);

δ: amount of elevation of lens relative to holder;

φ1: diameter of outer periphery of lens.

Figure 8:
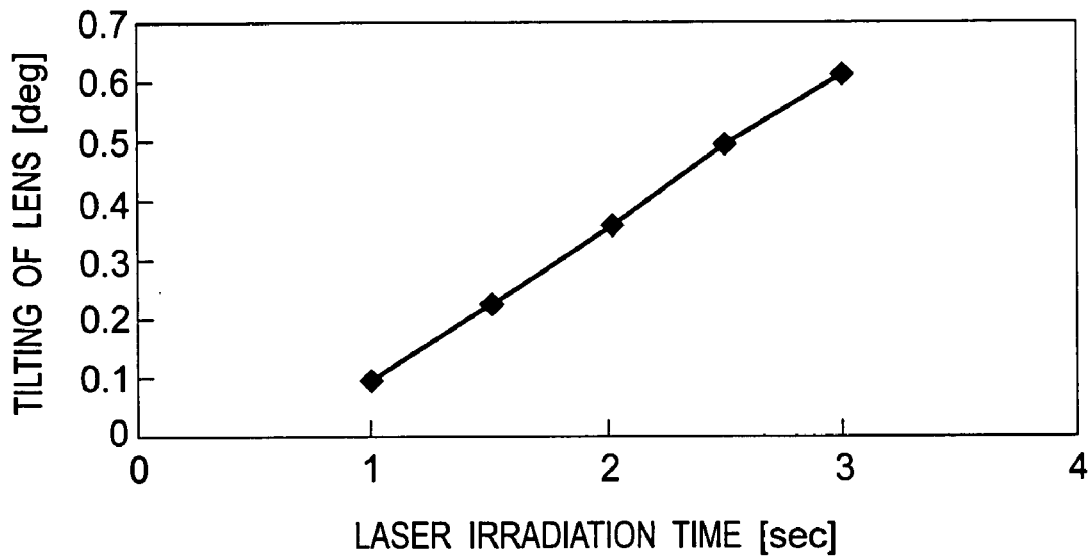
FIG. 8 is a diagram showing a graph indicating a relationship between a laser irradiation time and an amount of tilting of the lens.

Although the unit "radian" is used in the equation for representing the amount of tilting, the amount of tilting in FIG. 8 is unit-converted into "degree".

The test results are shown in graphs of FIG. 8. As can be seen from the graph, the tilting of the lens is in proportional relationship with the laser irradiation time, which means that the tilting of the lens is precisely adjustable by controlling the laser irradiation time. Although the laser source 56 is positioned above the lens in the above description, it may be positioned below the lens or outside the peripheral portion provided that the laser can be converged at or adjacent the boundary surface 66 between the upper support portion 62 of the support 20 and the associated contacting and opposing portion 64 of the lens.

The heat deformation of the laser-irradiated portion of the lens was visually observed during the irradiation. The observation showed that the laser-irradiated lens portion began to melt and expand after one second from the start of the laser-irradiation. The concaved recess appeared in the melted zone of the lens after 1.5 second from the start of the laser irradiation, which was extended radially outwardly with the increase of the laser irradiation time. The height of the ridge formed with the melted lens material flown radially outwardly was increased with time. The lens material flown radially outwardly was hardened after the completion of the laser irradiation. Afterwards, the lens was removed from the holder, and the laser irradiated portion of the holder and the lens were visually inspected. The inspection showed that the generation of the annular ridge on the lens was confirmed. However, no transformation was confirmed except for the existence of the burned trace on the support of the holder.

Figure 9:
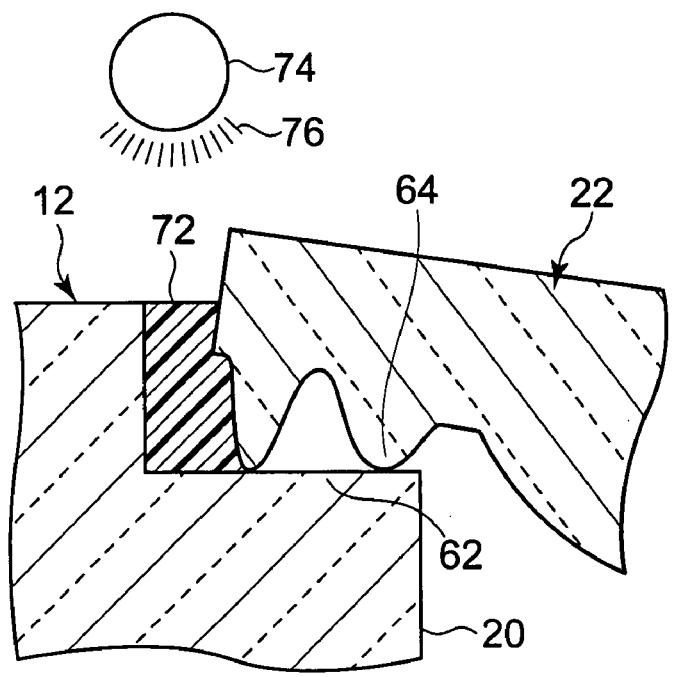
FIG. 9 is a cross sectional view showing a securing method of the lens to the holder.

The lens 22 of which tilting thereof has been adjusted as described above is then fixed to the holder 12. An ultraviolet cure resin is preferably used in this fixing process. Specifically, this process includes an application of the ultraviolet cure resin, which is performed before the tilting adjustment described above, between the opposed portions of the holder 12 and the lens 22, for example, as shown in FIG. 9, between the support portions 62 of the holder 12 and the opposing lens portions 64 of the lens 22 and also between the inner peripheral surface portions of the holder and the opposing outer peripheral surface portions of the lens 22 on the supports 20 of the holder 12. The ultraviolet cure resin so applied is exposed to ultraviolet rays 76 from the ultraviolet ray irradiation device 74 so that the ultraviolet cure resin 72 is cured. According to this process, the ultraviolet cure resin 72 is in part exposed to laser in the later tilting adjustment; however, the ultraviolet cure resin does not deteriorate thereby and cures by the later irradiation of the ultraviolet rays without any problem. The ultraviolet cure resin 72 may be applied on the support portions 62 before the placement of the lens 22 on the holder 12 or may be flown in between the support portions 62 and the opposing lens portions 64 after the placement of the lens 22 on the holder 12. Although in the description above, the ultraviolet cure resin 72 is applied before the tilting adjustment of the lens, it may be applied after the tilting adjustment.

Figure 10:
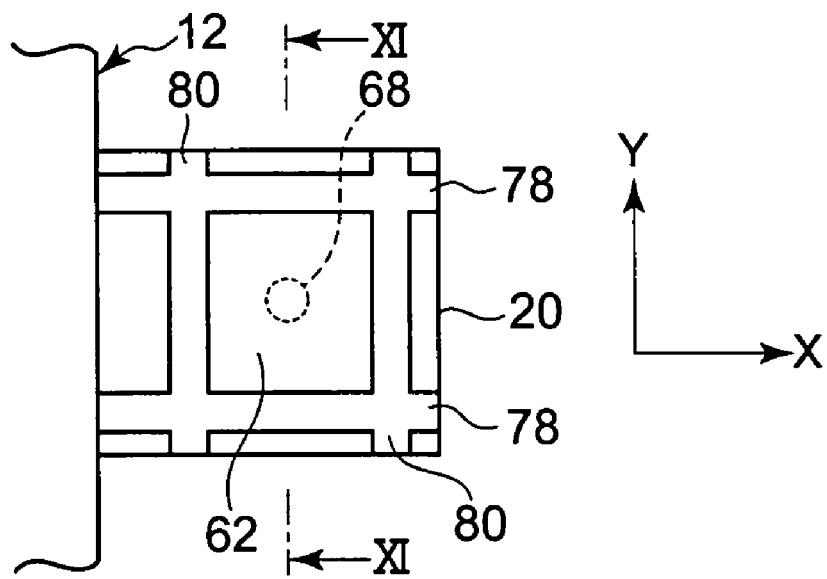
FIG. 10 is a diagram showing grooves defined on the lens holder for receiving an ultraviolet cure resin.
Figure 11:
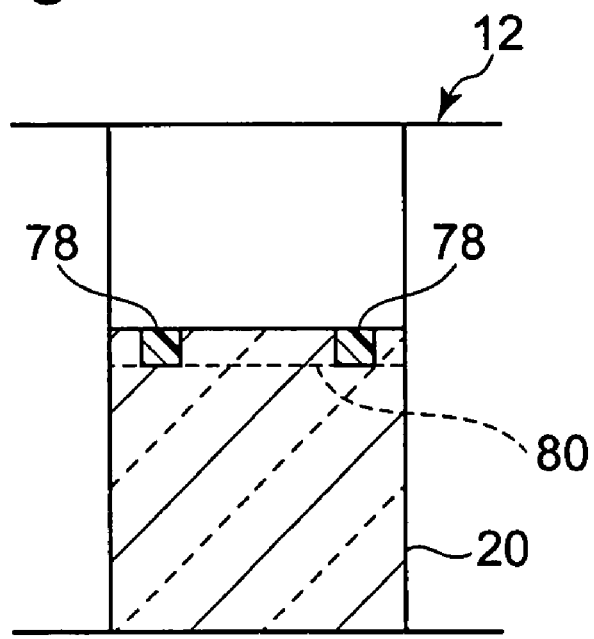
FIG. 11 is cross sectional view taken along lines XI-XI in FIG. 10.
Figure 12:
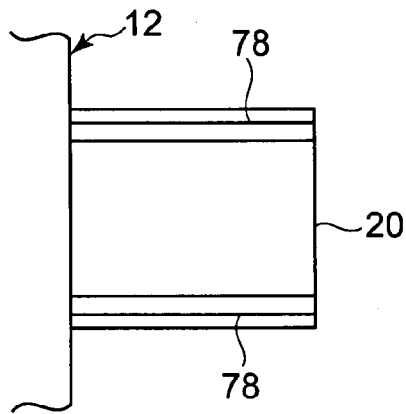
FIG. 12 is a plan view showing another embodiment of the arrangement of the grooves.
Figure 13:
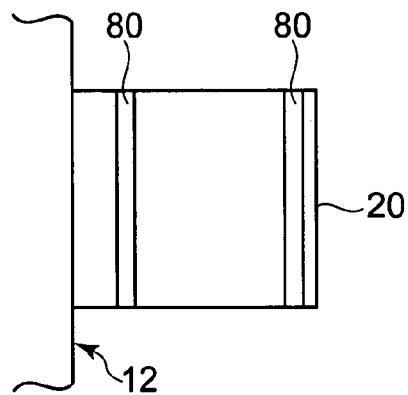
FIG. 13 is a plan view showing another embodiment of the arrangement of the grooves.
Figure 14:
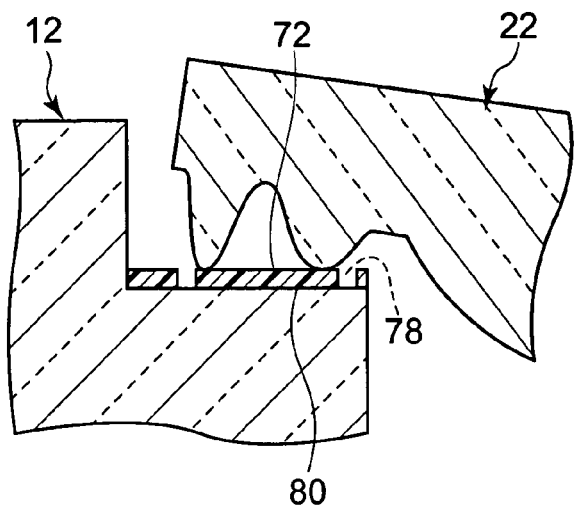
FIG. 14 is a cross sectional view showing the melted lens material restricted by the grooves.

In order to apply a predetermined amount of ultraviolet cure resin 72 between the support portions 62 of the holder 12 and the lens portions 64 of the lens 22, as shown in FIGS. 10 and 11 each support portion 62 is preferably formed, at opposite sides of the heating center 68, with a pair of parallel grooves 78 extending in a direction parallel to the X-direction and a pair of parallel grooves 80 extending in another direction parallel to the Y-direction, for receiving the ultraviolet cure resin 72 therein. Advantageously, the grooves 78 extending in the X-direction allows that the ultraviolet cure resin 72 supplied between the opposing vertical surfaces of the holder 12 and the lens 22 after the placement of the lens 22 on the holder 12 flows along the grooves 78 between the support portion 62 and the opposing lens portion 64. It is not necessary to provide both grooves 78 and 80 and only one of them may be provided instead. The grooves ensure that a certain amount of ultraviolet resin is accommodated between the support portion 62 and the opposing lens portion 64. In addition, the grooves also ensure that the melted lens material is restricted within a region surrounded by the grooves 78 and 80 and, thereby, the height of the ridge 70 is increased effectively within the region.

Figure 15:
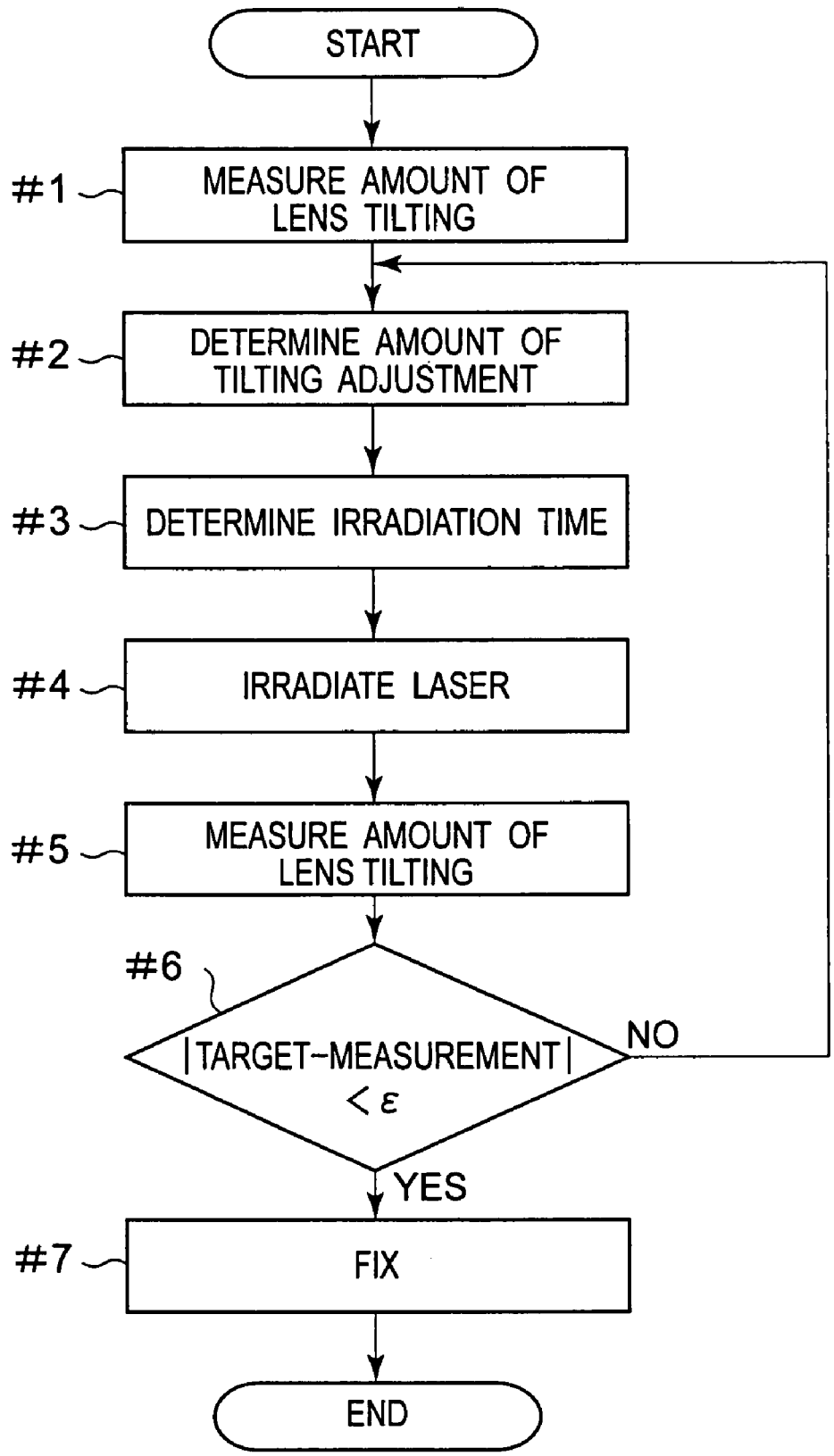
FIG. 15 is a flow chart showing a process for adjusting the posture of the lens.
Figure 16A:
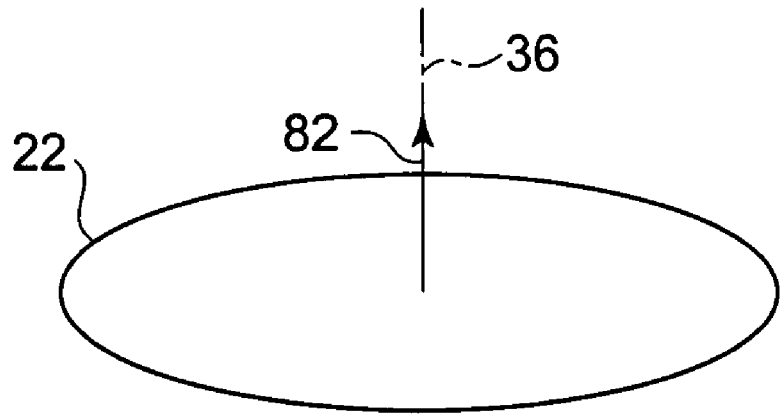
FIG. 16A is a diagram for use in describing a process for adjusting the posture of the lens.
Figure 16B:
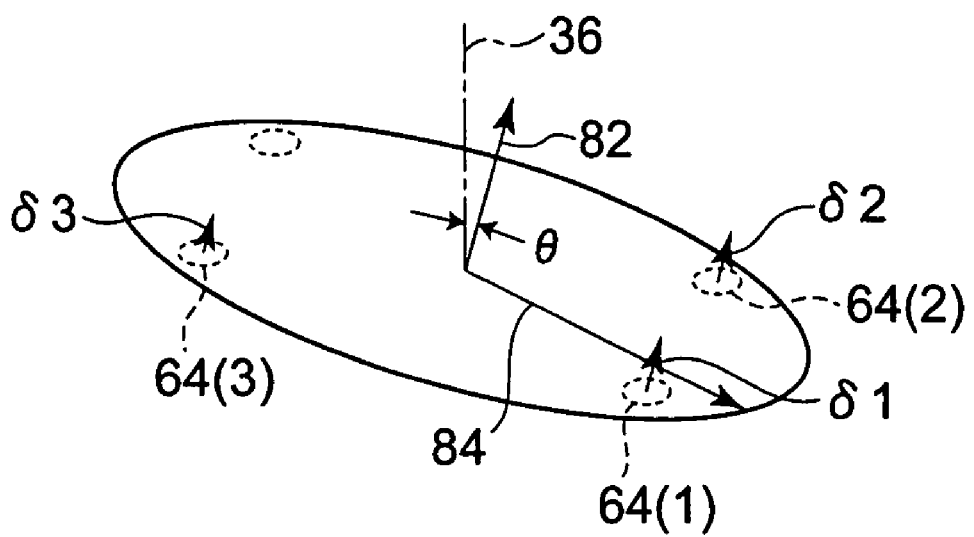
FIG. 16B is a diagram for use in describing a process for adjusting the posture of the lens.

Descriptions will be made of a process of the tilting adjustment. As shown in FIG. 15, at step 1, the lens 22 is placed on the holder 12 and the tilting of the lens 22 is measured. The measurement of the tilting is performed by means of the adjusting unit 32 and the control unit 34 of the posture control system 28 and the control unit 34 determines the posture of the lens. Specifically, the light from the light source 38 is transmitted through the lens 22 into the image receptor 52 where the position of the light spot received thereby is compared with the ideal position and, by use of the displacement between the actual spot position and the ideal position, the tilting of the lens 22 is determined. At step 2, the controller 34 further determines an amount of adjustment for the tilting. Assuming, for example, that the central axis 82 of the lens 22 supported by four supports 20 as shown in FIGS. 2 and 3 is tilted at angle $\theta$ relative to the optical axis 36 as shown in FIGS. 16A and 16B and the maximum tilting direction extends in the direction indicated by arrow 84. In this instance, the controller 34 determines the maximum tilting direction 84 and the lens portion 64(1) where the maximum height adjustment is needed. Then, the controller 34 determines the amount of height adjustment $\delta 1$ for the lens portion 64(1), and the amount of height adjustments $\delta 2$ and $\delta 13$ of the lens portions 64(2) and 64(3) located on opposite sides of the lens portion 64 (1). The controller 34, which stores a table indicating the relationship between the laser irradiation time and the resultant height adjustment, determines the laser irradiation times corresponding to the amounts of height adjustment needed for the respective lens portions 64(1), 64(2), and 64(3) by the use of the table at step 3. The graph in FIG. 8 shows the relationship between the laser irradiation time and the amount of tilting. Similar to this, the laser irradiation time and the amount of height adjustment has a similar proportional relationship, which is stored in the form of a table within the memory (ROM) of the controller 34. At step 4, the controller 34 energizes the laser source 56 disposed above the lens portions 64(1), 64(2), and 64(3) to irradiate laser beams, thereby heating the lens portions 64(1), 64(2), and 64(3) for respective time periods obtained from the table. Preferably, the laser is projected at the intermediate portion of the peripheral portion of the lens. This is because the laser irradiation at the innermost peripheral portion adjacent the effective region of the lens can negatively affect the effective region of the lens and, on the other hand, the laser irradiation at the outermost peripheral portion away from the effective region of the lens can cause the melted lens material to extend outside beyond the peripheral portion of the lens. Each of the heated lens portions 64(1), 64(2), and 64(3) exposed to laser are heated and thereby begin to melt. The melted lens materials of the lens portions 64(1), 64(2), and 64(3) flow down toward the respective support portions 62, raising the lens portions 64(1), 64(2), and 64(3) upwardly. When the laser irradiation is completed, the controller 34 measures the tilting of the lens 22 again at step 5 and, by the use of the measurements, calculates the differences between the target heights (the target amounts of height adjustment $\delta 1$, $\delta 2$, and $\delta 3$) and the corresponding measurements (the resultant height elevations $\delta 1'$, $\delta 2'$, and $\delta 3'$). The controller 34 then determines whether the absolute differences ($|\delta 1-\delta 1'|$, $|\delta 2-\delta 2'|$, and $|\delta 3-\delta 3'|$) stays within the predetermined tolerance $\epsilon$. Preferably, the tolerance $\epsilon$ is determined from the results obtained from simulations and/or actual tests. If each of the absolute differences stays within the tolerance, the ultraviolet ray source 74 emits ultraviolet rays 76 onto the ultraviolet cure resin 72, curing the ultraviolet cure resin to fix the lens 22 against the holder 12. If, on the other hand, any one of the absolute differences between the target height and the resultant height stays outside the tolerance, an amount for height adjustment and time period of laser irradiation is determined in light of the measurement results and the height of the lens is adjusted again, as necessary.

Although the three lens portions, i.e., the lens portion adjacent the most tilting direction and the lens portions on opposite sides of the direction are height-adjusted, only two lens portions 64(1) and 64(2) close to and on opposite sides of the direction are height-adjusted instead.

The above-described embodiment can be modified in various ways as will be described below, without departing from the scope of the present invention.

Second Embodiment

Figure 17:
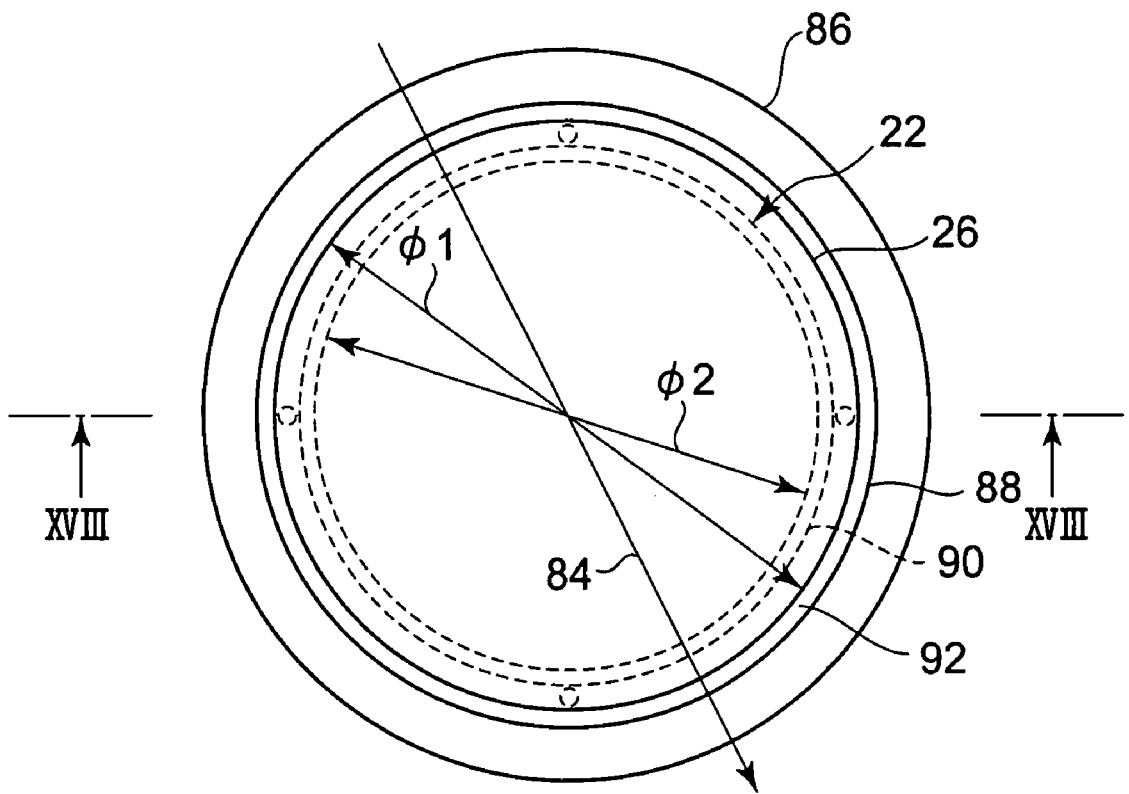
FIG. 17 is a plan view showing an optical unit including the holder of another embodiment.
Figure 18:
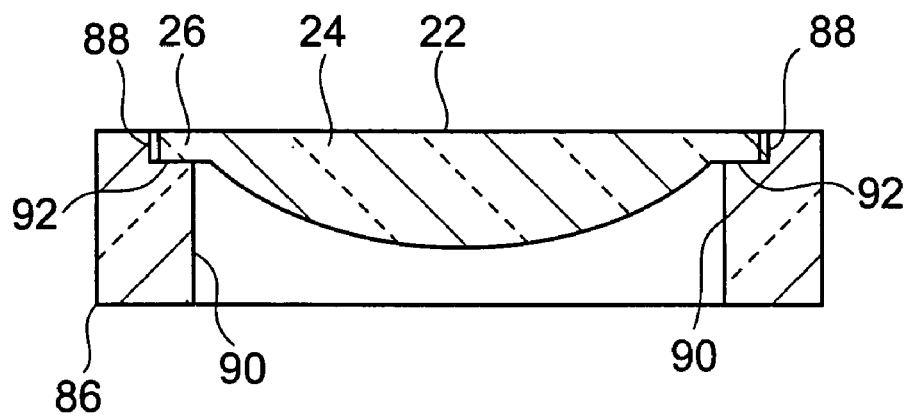
FIG. 18 is a cross sectional view taken along line XVIII-XVIII in FIG. 17.

Although in the first embodiment the lens is supported at four points by the holder, the number of supporting points is not restrictive as long as the lens is stably supported by the holder. For example, according to another embodiment in FIG. 17, the annular or rectangular holder 86 has an upper inner peripheral surface portion 88 having a larger inner diameter than the outer diameter $\phi 1$ of the peripheral portion 26 of the lens 22, a lower inner peripheral surface portion 90 having an inner diameter that is smaller than the outer diameter $\phi 1$ of the peripheral portion 26 of the lens but larger than the outer diameter $\phi 2$ of the spherical portion 24 of the lens 22, and an annular step portion extending between the upper inner peripheral surface portion 88 and the lower inner peripheral surface portion 90, so that the outer peripheral portion 26 of the lens 22 is supported on the annular step portion 92. In this instance, similar to the first embodiment, in operation of the posture adjustment of the lens 22 relative to the holder 12, the maximum tilting direction 84 of the lens 22 relative to the holder 86 is determined and three laser sources 56 are energized to adjust respective heights of the lens portions 64(1), 64(2), and 64(3) or two laser sources 56 are energized to adjust respective heights of the lens portions 64(1) and 64(2). According to this embodiment, the portions to be height-adjusted are selected freely and therefore the adjustment can be done more precisely.

Third Embodiment

Figure 19:
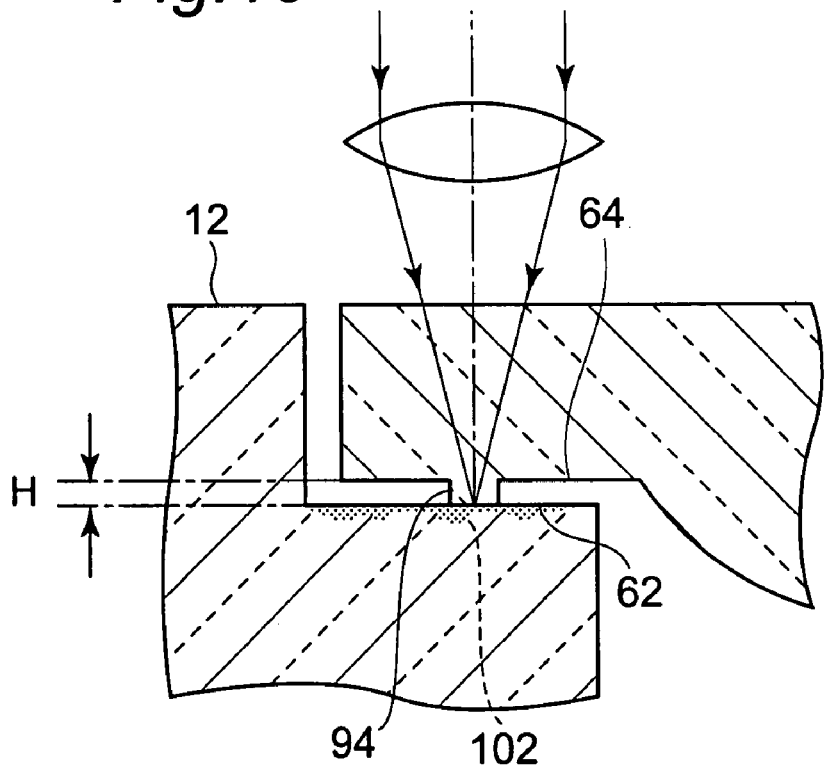
FIG. 19 is a cross sectional view showing a part of the optical unit including lens with posture adjusting projections and the posture adjusting method.
Figure 20:
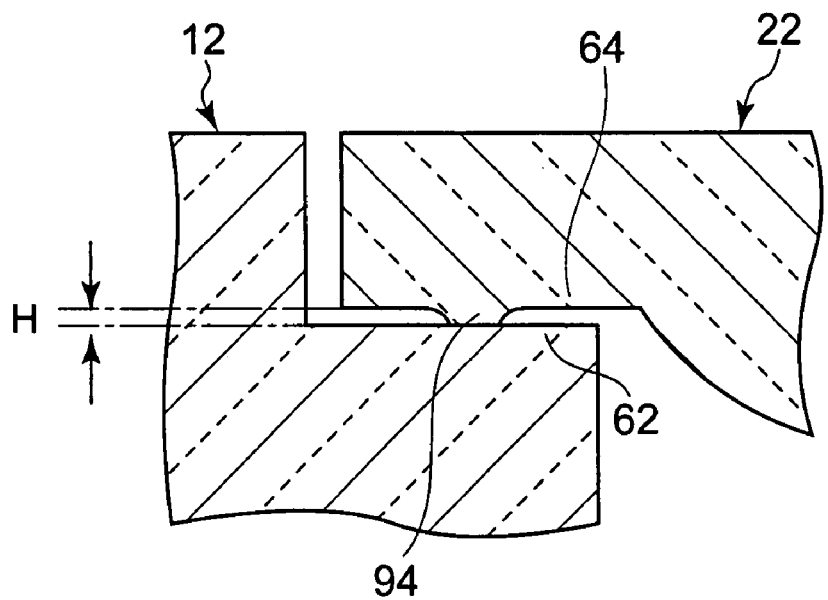
FIG. 20 is a cross sectional view showing a part of the optical lens of which posture is adjusted according to the method shown in FIG. 19.

Although in the first embodiment the lens portion and the opposing lens support portion of the holder are designed flat, the lens portion may be formed with projections. In this embodiment, for example, as shown in FIGS. 19 and 20, each of the lens portions 64 opposing the associated support portion 62 of the holder 12 has a projection 94 extending toward the support portion 62. The projection 94 is heat-melted to reduce its height from H to H', thereby adjusting the heights of the lens portions 64 relative to the support portions 62. According to the tests made by the inventors of the present invention, it was confirmed that the there exists a certain relationship between the time period of laser irradiation and the resultant height reduction (H-H') of the projection. Therefore, the relationship between the time period of laser irradiation and the height reduction is stored in the memory of the controller and, by the use of this relationship, the time period of laser irradiation is determined for the necessary amount of height reduction. The cross-section of the projection may have a circular, ellipse, rectangular or any configuration. Also, the number of the projections 94 for each support portion 62 may be plural, and thus is not limited to one. According to this embodiment, it is more advantageous because the present invention is carried out by the use of conventional lens holder and therefore it is not necessary to develop a new design of lens holder.

Fourth Embodiment

Figure 21:
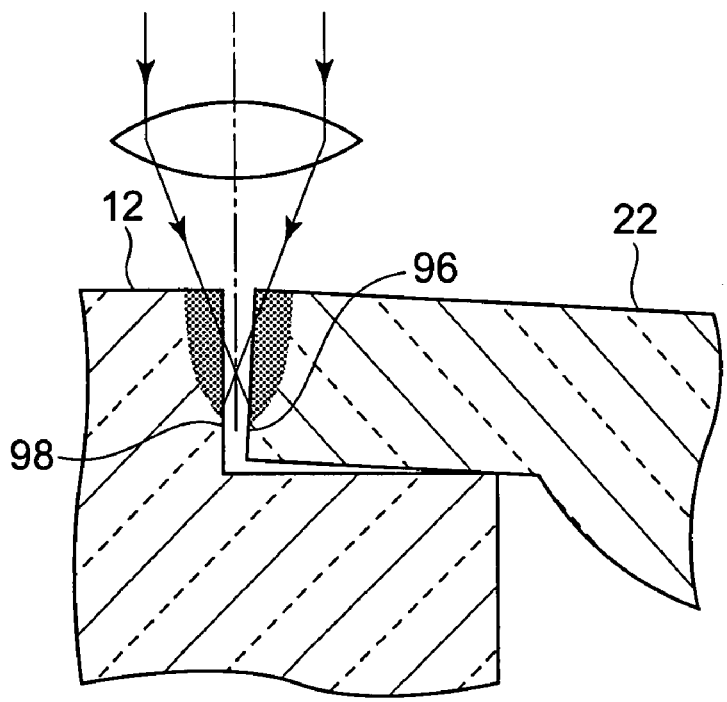
FIG. 21 is a cross sectional view showing a method for melting a part of the holder and/or lens and thereby adjusting the posture of the optical unit.
Figure 22:
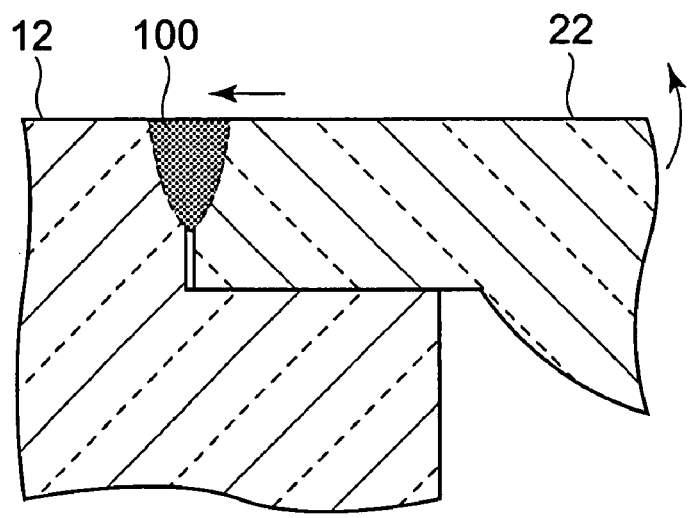
FIG. 22 is a cross sectional view showing a method for melting a part of the holder and/or lens and thereby adjusting the posture of the optical unit, in combination with FIG. 21.

Although in the first to third embodiments the posture of the lens relative to the holder is adjusted by melting and thereby deforming a part of the lens, it may be done by heat-melting a part of the lens opposing the holder and/or a part of the holder opposing the lens. Although, in particular, according to the previous embodiments, the lens material having a lower glass-transition temperature than the holder material is used in order to selectively melt the lens only, the holder material having a lower glass-transition temperature than the lens material is used instead to selectively melt a part of the holder for the posture adjustment of the lens relative to the holder. For example, in the first embodiment the support portion 62 of the holder 12 may be heat-expanded by laser irradiation, raising the height of the opposing lens portion 64 to adjust the posture of the lens 22. Also, in the third embodiment the projection may be provided on the support portion 62 of the holder 12 so that it is heat-deformed to reduce the elevation of the opposing lens portion 64 for the posture adjustment of the lens 22. Further, in the second embodiment, as shown in FIGS. 21 and 22, the outer peripheral surface 96 of the lens 22 and/or the opposing inner peripheral surface 98 of the holder is heat-melted by the laser irradiation. In this instance, the tilting angle of the lens 22 relative to the holder 12 and the posture of the lens 22 are adjusted by the strain caused at the shrinkage of the melted material 100.

Fifth Embodiment

Figure 23:
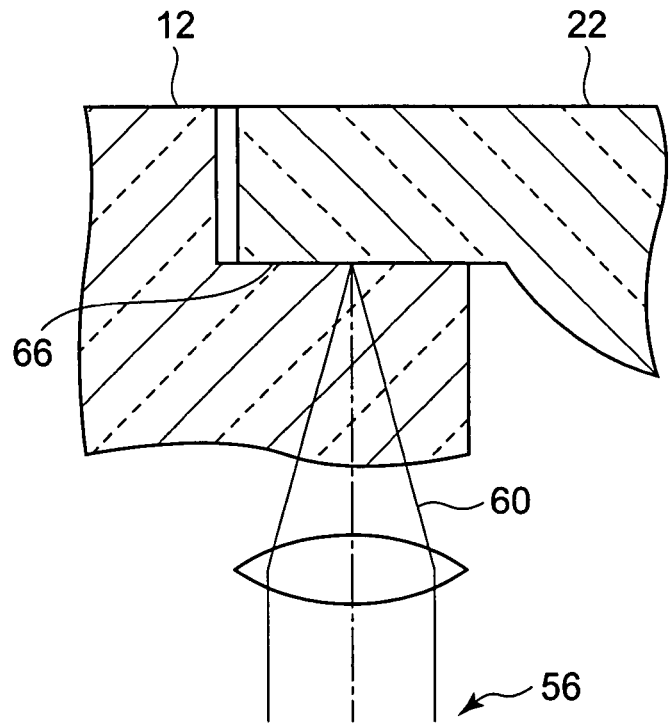
FIG. 23 is a cross sectional view showing a method for irradiating laser to a melting position from below.

The direction along which the laser is irradiated toward the boundary of the holder and the lens is not restrictive. For example, as shown in FIG. 23 the laser source 56 may be disposed below the holder so that the laser 60 irradiate to the boundary 66 from below. Preferably, in this embodiment the holder 12 is made of material capable of transmitting substantially 80% or more of visible light and near-infrared ray having a wavelength of substantially 400-1,100 nm, for example. The lens 22 is preferably made of material capable of absorbing substantially 80% or more of visible light and near-infrared ray having a wavelength of substantially 400-1,100 nm, for example. Alternatively, the laser source 56 may be positioned above and inside or outside of or beside the boundary surface 66 so that the laser 60 is irradiated obliquely against the boundary surface 66.

Sixth Embodiment

Preferably, for the previous embodiments, portions of the surface to which the laser is irradiated, i.e., the support portion of the holder and/or the lens portion of the lens, may be formed with small convex and concave portions as shown in FIGS. 4 and 19 by reference numeral at 102. In this instance, when a major part of the laser energy is consumed at the surface portions of the convex and concave portions, the heating of the surface portions is improved.

Seventh Embodiment

Figure 24:
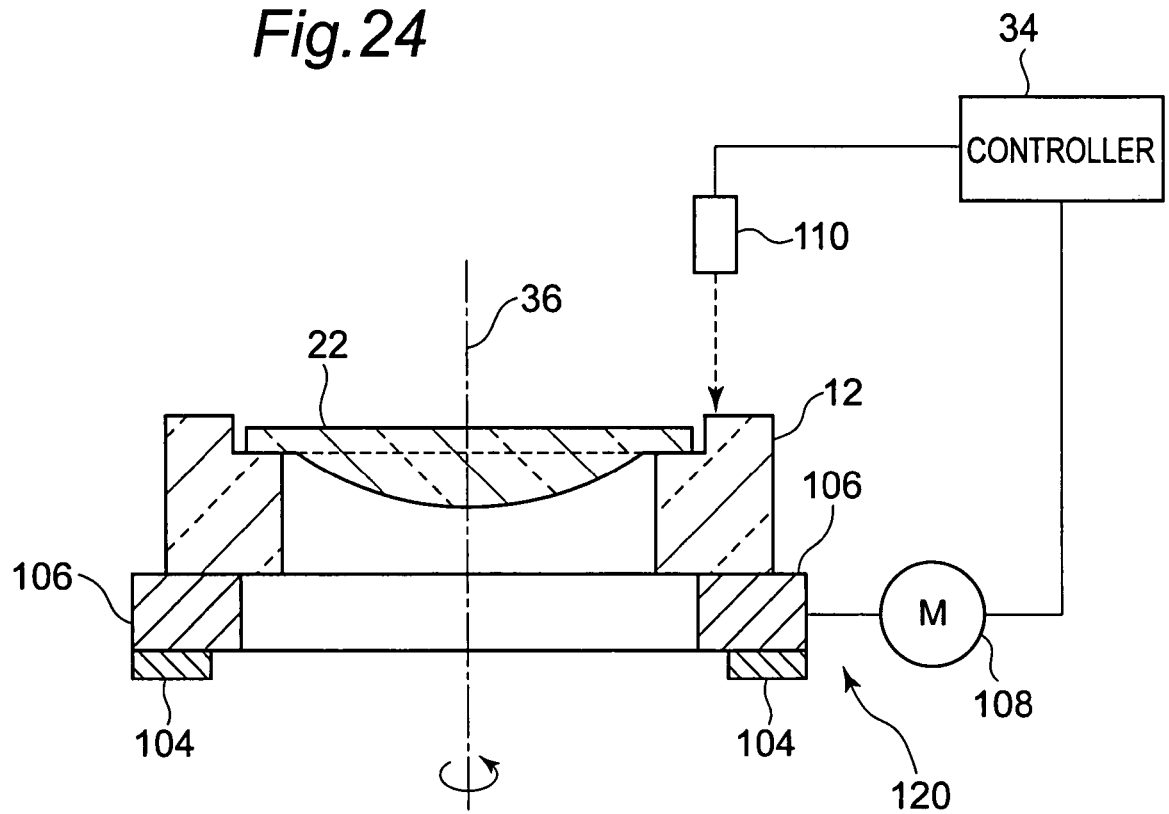
FIG. 24 is a diagram showing a device for securing the lens to the holder.
Figure 25:
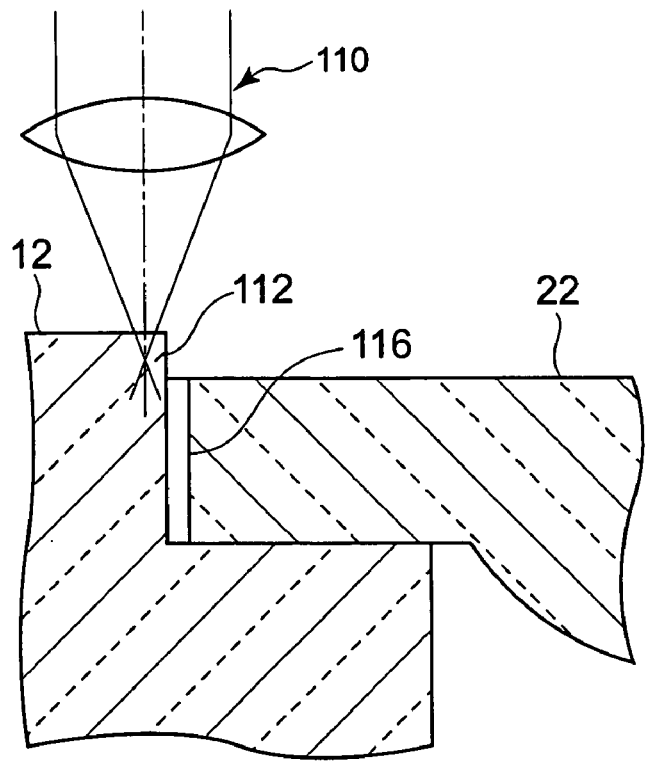
FIG. 25 is a diagram showing another method for securing the lens to the holder.
Figure 26:
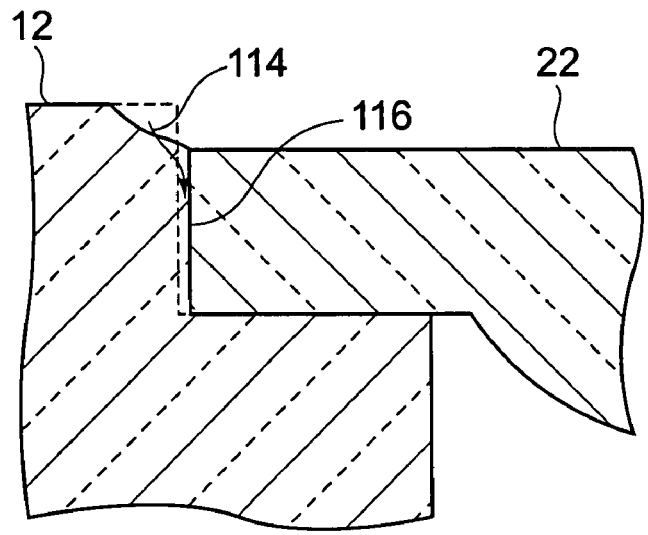
FIG. 26 is a cross sectional view for use in describing another method for securing the lens to the holder, in combination with FIG. 25.

The method for fixing the lens to the holder after adjustment is not limited to the use of ultraviolet cure resin and it may be done by heat-melting a part of the holder and thereby securing the melted holder material to the lens surface. For example, another embodiment shown in FIGS. 24-26 has a holder rotating mechanism 120 for this purpose. The holder rotating mechanism 120 has a fixed base 104 and a rotatable member 106 supported for rotation about the optical axis 36 relative to the base 104. Also, the rotatable member 106 supports the holder 12 and is drivingly connected to a motor 108 which is electrically connected to the controller 34. A heat source 110 is disposed above the holder 12 and is electrically connected to the controller 34. The heat source 110 may be a laser for emitting a heat beam. The laser may be irradiated obliquely at a certain angle against the holder 12. With this arrangement, after the completion of the posture adjustment, the controller 34 drives the motor 108 to rotate the rotatable member 106 and the holder 12 supported thereby and energizes the heat source 110 to heat-melt the portions 112 of the holder 12 opposing the lens periphery. During the rotation of the rotatable member 106, the heat source 110 may be constantly or intermittently energized to heat the portions 112 of the holder 12. This results in, as shown in FIG. 26, the melted holder material 114 filling the gap between the peripheral surface 116 of the lens and the holder 12 and adhering on the peripheral surface 116 of the lens. Once cooled, the melted holder material 114 adheres firmly on the peripheral surface 116 of the lens to hold the lens 22.

Eighth Embodiment

The mechanism for rotating the holder and the lens described in the seventh embodiment can be equally employed for the previous embodiments. For example, as shown in FIG. 3, a single laser 56 is sufficient if the rotatable mechanism 120 is employed in the first embodiment. Also, any portion of the annular step portion 92 can be heated if the rotatable mechanism 120 is employed in the second embodiment shown in FIG. 17.

Other Embodiments

Although the laser emitting heat-beam is used for heating the holder and/or lens in the previous embodiments, another heater such as a resistant heater or heater using an electronic beam may instead be used. The heating means is preferably is a non-contact type heating means in order to prevent the displacement of the lens relative to the holder.

Various heat-melting materials may be used for the lens and holder material. For example, the heat melting resin such as not only amorphous polyolefin but also polycarbonate and methacrylate may be used for the lens material. Not only liquid crystal polymer but also polycarbonate, polybutyleneterephthalate, polyethyleneterephthalate, polyphenylsulfone may be used for the holder material.

Further, although the plane-convex lens is used in the previous embodiments, the present invention is equally applied to the posture adjustment of the other lens such as convex-convex lens, meniscus-convex lens, concave-concave lens, plane-concave lens, meniscus-concave lens, spherical lens, and cylindrical lens.

Although the examples are shown in which the present invention is used for the posture adjustment, the present invention is applicable to the posture adjustment of other optical elements or components such as diffraction grating, mirror, filter and aperture plate.

Further, the present invention is applicable not only to the posture adjustment of the optical element incorporated in an optical unit but also to the posture adjustment of one member (second member) relative to the other member (first member). In this instance, the posture of the first member relative to the second member is adjusted by heat-melting and thereby deforming a part or parts of the first and/or second member.

RELATED APPLICATION

The present application claims the priority of the Japanese Patent Application Serial No. 2004-365673, filed on Dec. 17, 2004, entitled "Optical device and its adjusting method", the entire disclosure of which being incorporated by reference herein.

The invention claimed is:

1. A method for manufacturing an optical unit having an optical element and a support member for supporting the optical element, the method comprising:
    heating and deforming a portion of at least one of opposing surfaces of the optical element and the support member to extend the deformed portion toward the other of the opposing surfaces so that the optical element moves relative to the support member; and
    securing the optical element and the support member together.

2. The manufacturing method of claim 1, wherein the heating and deforming step is performed by irradiating a laser to at least one of the opposing surfaces of the optical element and the support member.

3. The manufacturing method of claim 2, wherein the laser is irradiated through the optical element to the support member for deforming the support member.

4. The manufacturing method of claim 2, wherein the laser is irradiated through the support member to the optical element for deforming the optical element.

5. The manufacturing method of claim 2, further comprising:
    providing a table with relationships between laser power, laser irradiation time, and an amount of deformation; and
    adjusting the laser according to the table and an amount of tilting of the optical element relative to the support member.

6. The manufacturing method of claim 2, further comprising:
    disposing an ultraviolet cure resin between the optical element and the support member; and
    after deforming at least one of the optical element and the support member, irradiating ultraviolet light to the ultraviolet cure resin.

7. The manufacturing method of claim 2, wherein the optical element is made of amorphous polyolefin and the support member is made of liquid crystal polymer.

8. A method for manufacturing an optical unit having an optical element and a support member for supporting the optical element, the method comprising:
    deforming at least one of opposing surfaces of the optical element and the support member; and
    securing the optical element and the support member together,
    wherein a laser is irradiated to at least one of the opposing surfaces of the optical element and the support member,
    wherein one of the optical element and the support member is made of material capable of transmitting 80% or more of light having the same wavelength as the laser emitted from a laser source, and the other of the optical element and the support member is made of material capable of absorbing 80% or more of light having the same wavelength as the laser emitted from the laser source.

9. The manufacturing method of claim 8, wherein the wavelength of the laser emitted from the laser source has the wavelength of 810 nm.

10. The manufacturing method of claim 8, further comprising:
    measuring a tilting of the optical element relative to the support member,
    determining an amount of target deformation of at least one of the opposing surfaces of the optical element and the support member according to a measurement result and then deforming at least one of the opposing surfaces; and
    measuring again the tilting of the optical element relative to the support member; and
    deforming again at least one of the opposing surfaces if the measurement result is less than the target value.

11. An optical unit comprising:
    a support member; and
    an optical member supported by the support member;
    the support member having a first portion for supporting the optical member;
    the optical member having a second portion opposing the first portion of the support member; and
    one of the first and second portions having a projection that is projected into contact with the other of the first and second portions,
    wherein a position of the optical element relative to the support member is adjusted by heating and deforming the projection.

12. The optical unit of claim 11, further comprising an ultraviolet cure resin in a gap defined between the first and second portions and around the projection, the ultraviolet cure resin being cured to secure the first and second portions.

13. The optical unit of claim 12, wherein the optical member is a lens made of material capable of transmitting 80% or more of light having a wavelength of 801 nm and the support member is a lens holder made of material capable of absorbing 80% or more of light having a wavelength of 810 nm.

* * * * *